US008037191B2

(12) United States Patent
Lin et al.

(10) Patent No.: US 8,037,191 B2
(45) Date of Patent: Oct. 11, 2011

(54) LOW-LEVEL REMOTE SHARING OF LOCAL DEVICES IN A REMOTE ACCESS SESSION ACROSS A COMPUTER NETWORK

(75) Inventors: Jian Lin, Pleasant Hill, CA (US); Zheng Yuan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 12/267,955

(22) Filed: Nov. 10, 2008

(65) Prior Publication Data

US 2010/0121959 A1      May 13, 2010

(51) Int. Cl.
*G06F 15/16* (2006.01)
(52) U.S. Cl. ...................................................... 709/227
(58) Field of Classification Search ........................ None
See application file for complete search history.

(56) References Cited

U.S. PATENT DOCUMENTS

| 7,130,883 | B2 | 10/2006 | Zhu et al. |
| 7,203,755 | B2 | 4/2007 | Zhu et al. |
| 7,299,455 | B2 | 11/2007 | Anderson et al. |
| 7,333,474 | B2 | 2/2008 | Toor et al. |
| 2004/0028026 | A1 | 2/2004 | McClung et al. |
| 2006/0176874 | A1 | 8/2006 | Shaffer et al. |
| 2007/0011374 | A1* | 1/2007 | Kumar et al. ................ 710/105 |
| 2008/0147909 | A1* | 6/2008 | Zhang et al. .................... 710/24 |
| 2008/0270525 | A1* | 10/2008 | Thero et al. .................. 709/203 |
| 2009/0150550 | A1* | 6/2009 | Barreto et al. ................ 709/228 |
| 2009/0164644 | A1* | 6/2009 | Soderberg et al. ........... 709/228 |
| 2009/0282234 | A1* | 11/2009 | Faraboschi et al. .............. 713/2 |
| 2009/0310165 | A1* | 12/2009 | Olsson et al. ................ 358/1.15 |

FOREIGN PATENT DOCUMENTS

WO       WO 2008/000746       *    1/2008

* cited by examiner

*Primary Examiner* — Ario Etienne
*Assistant Examiner* — Clayton R Williams
(74) *Attorney, Agent, or Firm* — Cesari and McKenna, LLP

(57) ABSTRACT

In one embodiment, a remote access session may be established between a first computer and a second computer. In response to detecting a device in low-level local communication with the first computer via a first local communication port of the first computer, the low-level local communication at the first local communication port may be intercepted and transmitted to the second computer via the remote access session. Then, the low-level local communication may be injected to a second local communication port of the second computer, wherein the second computer responds to the low-level local communication as though the device were located at the second local communication port of the second computer. For example, the device may be configured to autoconnect with the second computer via the remote access session when the device is connected to the first computer.

24 Claims, 6 Drawing Sheets

LOW-LEVEL REMOTE SHARING OF LOCAL DEVICES IN A REMOTE ACCESS SESSION ACROSS A COMPUTER NETWORK

TECHNICAL FIELD

The present disclosure relates generally to computer networks, and, more particularly, to sharing local devices in remote access sessions.

BACKGROUND

Remote access services allow a local computer to access the resources of a remote computer through input/output (I/O) devices of the local computer via a computer network. For instance, a remote access server process executing on the remote computer may establish an operating system instance having a "desktop" display and one or more executing applications with access to storage devices interconnected with the remote computer. This operating system instance may then be transported to the local computer (executing a remote access client), such that a local operator may interface with the instance through a local display (e.g., monitor) and local input devices (e.g., mouse and keyboard). For example, the operating system instance may be the only instance on the remote computer (e.g., a current desktop display on the remote device), or may be an instance maintained for the purpose of serving one or more local client computers (e.g., per-user based remote desktop connections).

Typically, remote access services allow for devices to be shared at a high-level, e.g., based on a mapping of devices as recognized by the operating system. For instance, an operating system may determine that a device connected to a parallel port (or Line Print Terminal, "LPT" port) is a "printer" as recognized by the corresponding operating system, and thus the printer may be shared among the local and remote devices at a high-level (e.g., an operating system level). In other words, a low-level communication (i.e., a communication protocol defining, e.g., message types and their formats/contents) between the printer and the port is translated by the operating system to a high-level communication, which may then be shared with remote computers. If the operating system is unable to translate the low-level communication, then the high-level communication cannot be shared. Also, if the operating system is specifically configured to operate based on the low-level communication (e.g., automatically connecting or syncing the device), only the locally attached computer's operating system may be privy to such low-level communication. In addition, some remote access services allow clients to manually "mount" remote devices, such as storage devices (e.g., disks) or printers, but again, this mounting is performed at a high-level, e.g., through a remote server operating system granting access to the mounted devices.

BRIEF DESCRIPTION OF THE DRAWINGS

The advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, a remote access session may be established between a first computer and a second computer. In response to detecting a device in low-level local communication with the first computer via a first local communication port of the first computer, the low-level local communication at the first local communication port may be intercepted and transmitted to the second computer via the remote access session. Then, the low-level local communication may be injected to a second local communication port of the second computer, wherein the second computer responds to the low-level local communication as though the device were located at the second local communication port of the second computer. For example, the device may be configured to autoconnect with the second computer via the remote access session when the device is connected to the first computer.

Description

Architecture for Remote Access Sessions

Figure 1:
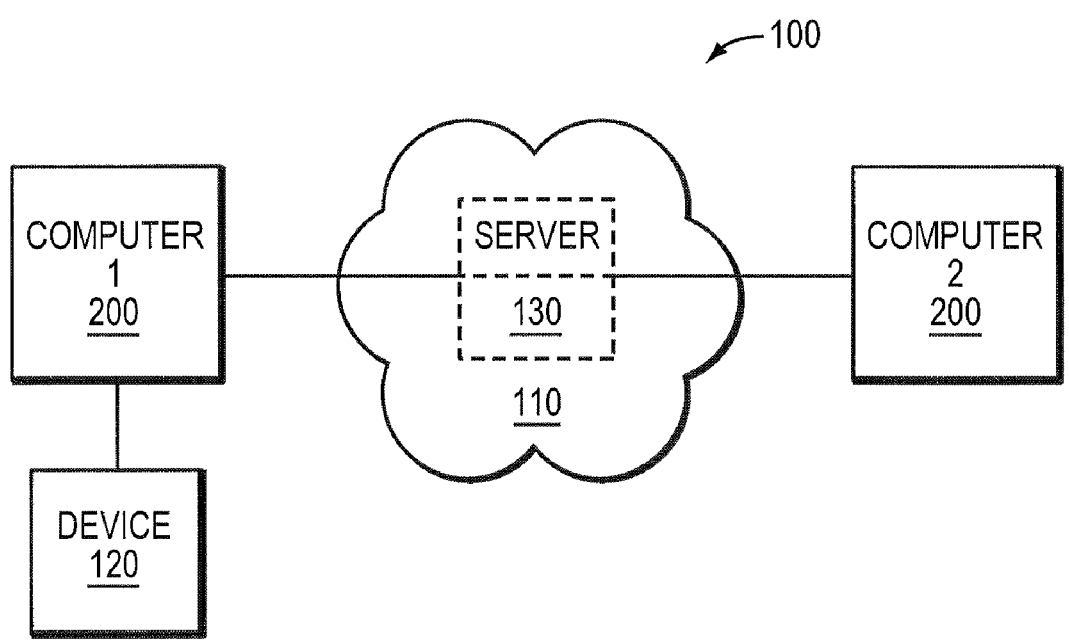
FIG. 1 illustrates an example computer network.

FIG. 1 is a schematic block diagram of an example computer network 100 illustratively comprising nodes/devices, such as one or more computers/devices 200 interconnected by links/network 110 as shown (e.g., optionally comprising one or more interaction servers 130). Those skilled in the art will understand that any number of devices, links, etc. may be used in the computer network, and that the view shown herein is for simplicity.

In this environment, the computers may interact in an on-line, interactive, or collaborative setting. In particular, as described herein, the computers may interact in a "remote access session," where one computer can access resources of another computer. As used herein, a "session" describes a generally lasting communication between one or more participant devices 200, e.g., through the interaction server 130. Those skilled in the art will understand that the session may be implemented/established using protocols and services provided by various layers (e.g., application, session, and/or transport layers) of a network protocol stack according to the well-known OSI model.

Each computer 200 may comprise an electronic device with capability for visual and/or auditory presentation. Thus, a "computer" 200 can be, for example, a desktop personal computer (PC), a laptop computer, a workstation, a personal digital assistant (PDA), a wireless telephone, a smart phone, an Internet television, and the like. Each computer 200 supports communication by a respective participant, in the form of suitable input device (e.g., keyboard, mouse, stylus, keypad, etc.) and output device (e.g., monitor, display, speech, voice, or other device supporting the presentation of audible/visual information). Each computer may be interconnected with a suitable communications network 110 such as, for example, the Internet, and may appear as a client computer thereon.

In one embodiment, each computer 200 may operate under the control of a suitable operating system (OS) (e.g., WIN- DOWS, UNIX, etc.) to run software applications (e.g., in the form of code modules) which may be installed, received, or downloaded. At least some of these software applications may support specific functions, such as, for example, functions related to the remote access sessions described herein.

The remote access sessions between computers (e.g., computers 1 and 2) may be supported by an interaction server 130, e.g., maintained or operated by a third-party service provider. The interaction server 130 may be a computer system that is connected to network 110, and which may comprise and appear as one or more server computers thereon. Interaction server 130 may store information (e.g., content) and application modules which can be provided to the computers 200. In some embodiments, these application modules are downloadable to the computers 200 and may support various functions that may be required for remote access sessions. The computers 200 and the interaction server 130 may interact in a client/server architecture, which may provide high performance and security for a multi-participant collaborative environment.

Network 110 may comprise or be supported by one or more suitable communication networks, such as, for example, a telecommunications network that allows communication via one or more telecommunications lines/channels. In particular, the communication or data networks, such as the Internet, may be used to deliver content, such as for the remote access sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP). Alternatively, applications other than web browsers may also use the Internet to transfer data between two or more devices, e.g., computers 200, for various purposes such as remote access sessions.

Figure 2:
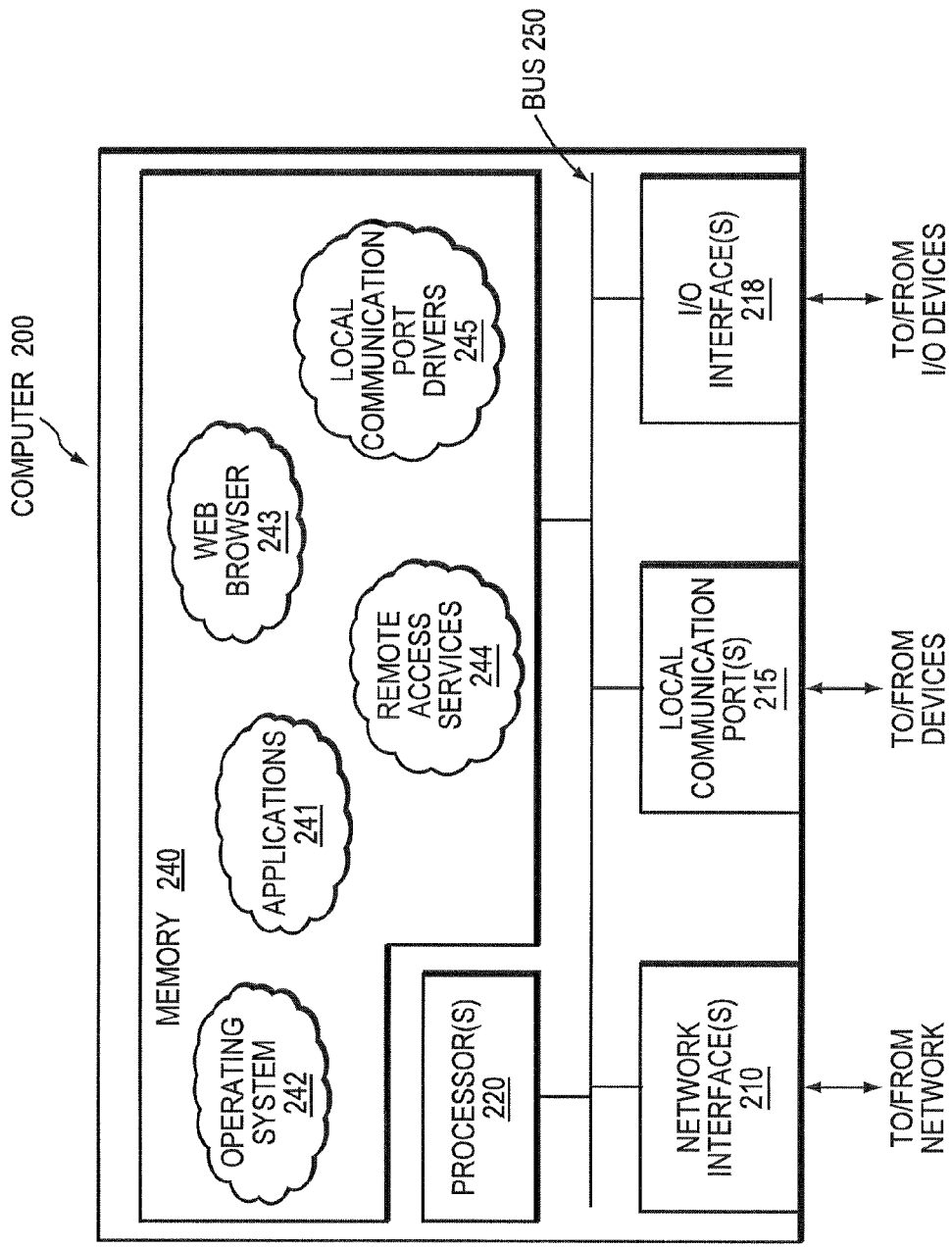
FIG. 2 illustrates an example computer.

FIG. 2 illustrates a schematic block diagram of an example computer 200 that may be advantageously used with one or more embodiments described herein, e.g., for remote access sessions. Illustratively, computer 200 may be implemented or incorporated in any suitable device such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the computer 200 comprises one or more network interfaces 210, one or more local communication ports 215, one or more input/output (I/O) interfaces 218, one or more processors 220, and a memory 240 interconnected by a system bus 250. The network interfaces 210 contain the mechanical, electrical, and signaling circuitry for communicating data over physical/wireless links coupled to the network 110. The network interface(s) may be configured to transmit and/or receive data using a variety of different communication protocols suitable for the network. Also, I/O interfaces 218 contain the mechanical, electrical, and signaling circuitry for communicating with one or more user interface devices, such as a mouse, keyboard, monitor/screen, etc. (not explicitly shown).

In addition, local communication ports 215 contain the mechanical, electrical, and signaling circuitry for communicating data over physical/wireless links coupled to the computer 200. The local communication ports 215 may be configured to transmit and/or receive data using a variety of different communication protocols. Illustratively, examples of such protocols include, inter alia, universal serial bus (USB), USB2 (or USB 2.0), and wireless personal area network (PAN) protocols (e.g., Bluetooth®). Also, local communication ports 215 may comprise conventional ports, such as serial ports (e.g., LPT ports, COM ports), as may be appreciated by those skilled in the art. The local communication ports 215 may be controlled by one or more corresponding local communication port drivers 246, as described below.

In particular, the memory 240 comprises a plurality of storage locations that are addressable by the processor(s) 220 for storing software programs associated with the embodiments described herein. A portion of the memory may (though need not) be arranged as a cache (not shown) configured to store one or more data structures and/or code modules associated with the embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise one or more applications 241, communication port drivers 246, and in particular a remote access process/service (e.g., server or client) 244. It will be apparent to those skilled in the art that other types of processors and memory, including various computer-readable media, may be used to store and execute program instructions pertaining to the inventive technique described herein, such as a web browser 243, known in the art. Also, remote access service 244 may be operated as an instance of suitable programs running on the hardware of a computer 200, as will be further appreciated by those skilled in the art.

Remote access service 244 may contain computer executable instructions executed by each processor 220 to generally perform functions to manage or control various processes during the course of a remote access session in which a participant (user) on a first computer may interact with resources of a second computer. For instance, remote access sessions, as may generally be understood by those skilled in the art, allow a local computer to access the resources of a remote computer through I/O devices of the local computer via a computer network 110. Illustratively, as noted, a remote access services process 244 executing on the remote computer may establish an operating system instance having a "desktop" display and one or more executing applications with access to storage devices interconnected with the remote computer (e.g., a current desktop display or a per-user based remote desktop connections). This operating system instance may then be transported to the local computer (executing a remote access client 244), such that a local operator may interface with the instance through a local display (e.g., monitor) and local input devices (e.g., mouse and keyboard). For example, a virtual private network (VPN) connection may be established between the local and remote computers to allow the necessary data to be transmitted therebetween.

In the context of remote access sessions, the remote access service 244 may manage session-related actions (e.g., starting a session, ending a session, locking a session, etc.), manage user-related actions (e.g., transmitting I/O between a local computer and a remote computer, etc.), manage access-related actions (e.g., sharing resources, setting privileges within that sharing session, etc.), and support an interface with the user or participant, and provide a container for embedding one or more application code modules. (Example remote access service programs that are currently commercially available may comprise "WebEx PCNow service," "WebEx Remote Access" and "WebEx SmartTech Service," available from WebEx Communications, Inc. of Santa Clara, Calif.)

Remote access service 244 may also support communication between local computers and remote computers through an outside network 110 (e.g., the Internet), such as through network interfaces 210 (e.g., through a VPN). Remote access service 244 thus allows data and information to be exchanged with or retrieved from other systems or facilities (e.g., computers 200 or interaction server 130), for example, during a remote access session, online meeting or other collaborative computing session. In particular, the remote access service 244 may provide a communication platform for any one or more of the applications 241, the remote access session, and any other program or component of the computers 200 as described herein. Illustratively, the remote access service 244 on each computer may establish and maintain the connection to the corresponding other computer (e.g., through interaction server 130, or directly to the other computer) on which the remote access session is hosted, and may provide real-time data that is sent and received by each computer.

Further, various functionality for supporting a remote access session may be provided by the one or more specific application code modules (not explicitly shown) of remote access service 244. These application code modules may be stored/maintained in memory 240 (e.g., a cache), and may support, for example, a basic communication framework to transport I/O between the computers and to otherwise manage shared/accessed resources on one or the other computer during a session. Note that one or more of the application code modules may be dynamic linked library (DLL or ".dll") executable object code files, as may be appreciated by those skilled in the art.

Notably, where optionally utilized, e.g., where computers do not communicate directly with one another, an interaction server 130 may supply various communication-related functionality for a remote access session. For example, server 130 may be a single computing device or a collection of server computers, and may provide an intermediary device/location between the two (or more) computers. In particular, server 130 may comprise a number of processing facilities, including, for example, one or more of a remote access server, a log server, a ping server, a collaboration server, license manager, meeting managers, application servers, etc., which may be integrated with a number of data storage facilities. Each computer of a remote access session may then access the server, and the server may provide the interconnection between the computers. (For instance, where the remote access session is an online collaborative computing session, such as desktop sharing, application sharing, etc., interaction server 130 may provide the communication channels used to interconnect one or more participant devices/computers, accordingly.)

As noted above, remote access services typically allow for devices to be shared at a high-level, e.g., based on a mapping of devices as recognized by the operating system. For instance, local communication port drivers 246 may interoperate with operating system 242 to receive low-level communications from ports 246, i.e., communications according to a messaging protocol of the particular device connected to (or "plugged in" to) the port, and translate the low-level communications into high-level communications, i.e., according to operating system level communications understood by operating system 242.

For example, an operating system may determine that a device connected to a parallel port is a "printer" as recognized by the corresponding operating system, and thus the printer may be shared among the local and remote devices at a high-level (e.g., an operating system level). In other words, the low-level communication between the printer and the port is translated by the operating system (and drivers) to a high-level communication, which may then be shared with remote computers. If the operating system is unable to translate the low-level communication, then the high-level communication cannot be shared (as there is no corresponding high-level translation). Also, if the operating system is specifically configured to operate based on the low-level communication (e.g., automatically connecting or syncing the device), only the locally attached computer's operating system may be privy to such low-level communication. For instance, many USB or Bluetooth® devices cannot be used during remote access sessions, such as music players with proprietary protocols, e.g., particularly those that automatically synchronize with a database when connected to a computer.

Remotely Sharing Local Devices via Remote Access Sessions

According to embodiments of the disclosure, a remote access session may be established between a first computer and a second computer. In response to detecting a device in low-level local communication with the first computer via a first local communication port of the first computer, the low-level local communication at the first local communication port may be intercepted and transmitted to the second computer via the remote access session. Then, the low-level local communication may be injected to a second local communication port of the second computer, wherein the second computer responds to the low-level local communication as though the device were located at the second local communication port of the second computer. For example, the device may be configured to autoconnect with the second computer via the remote access session when the device is connected to the first computer.

Illustratively, certain techniques described herein (e.g., the intercepting, transmitting, and injecting) may be performed by respective remote access services 244 of either a local or remote computer 200 accordingly. In particular, these processes and/or services may be configured to operate in accordance with certain techniques as described herein, such as to allow for remotely accessing locally connected devices based on the low-level communication of the devices.

Figure 3:
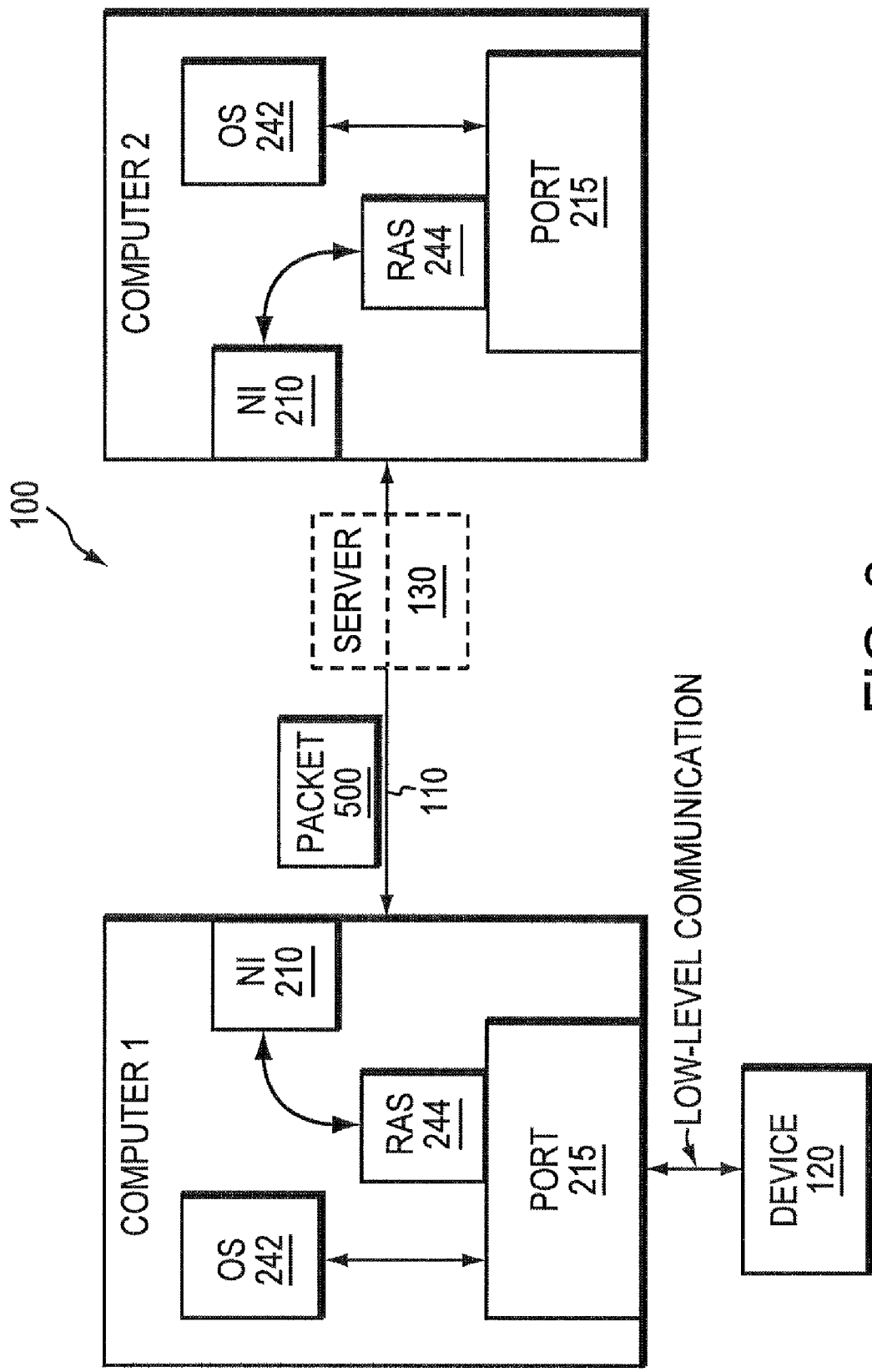
FIG. 3 illustrates an alternative view of the computer network with an example remote access session for remotely sharing local devices.

Operationally, a user at a local computer (e.g., computer 1) may establish a remote access session between the local computer and a remote computer (e.g., computer 2), as described above. FIG. 3 illustrates an example alternative view of network 100, showing illustrative components in corresponding communication. For instance, computers 1 and 2 show a corresponding operating system (OS) 242, remote access services (RAS) 244, network interface (NI) 210, and local communication port (port) 215. (An optional server 130 is also shown between communicating NIs 210 of each computer.) When a device 120 is interconnected with port 215 of computer 1, the low-level local communication at the port may be detected by the remote access service (e.g., RAS 244) operating on top of the port (e.g., by monitoring the port drivers for activity). Once the device (e.g., a USB device, Bluetooth® device, etc.) is detected, RAS 244 may prompt a user to allow the sharing of the device with the remote computer (e.g., 2) as described herein.

Figure 4:
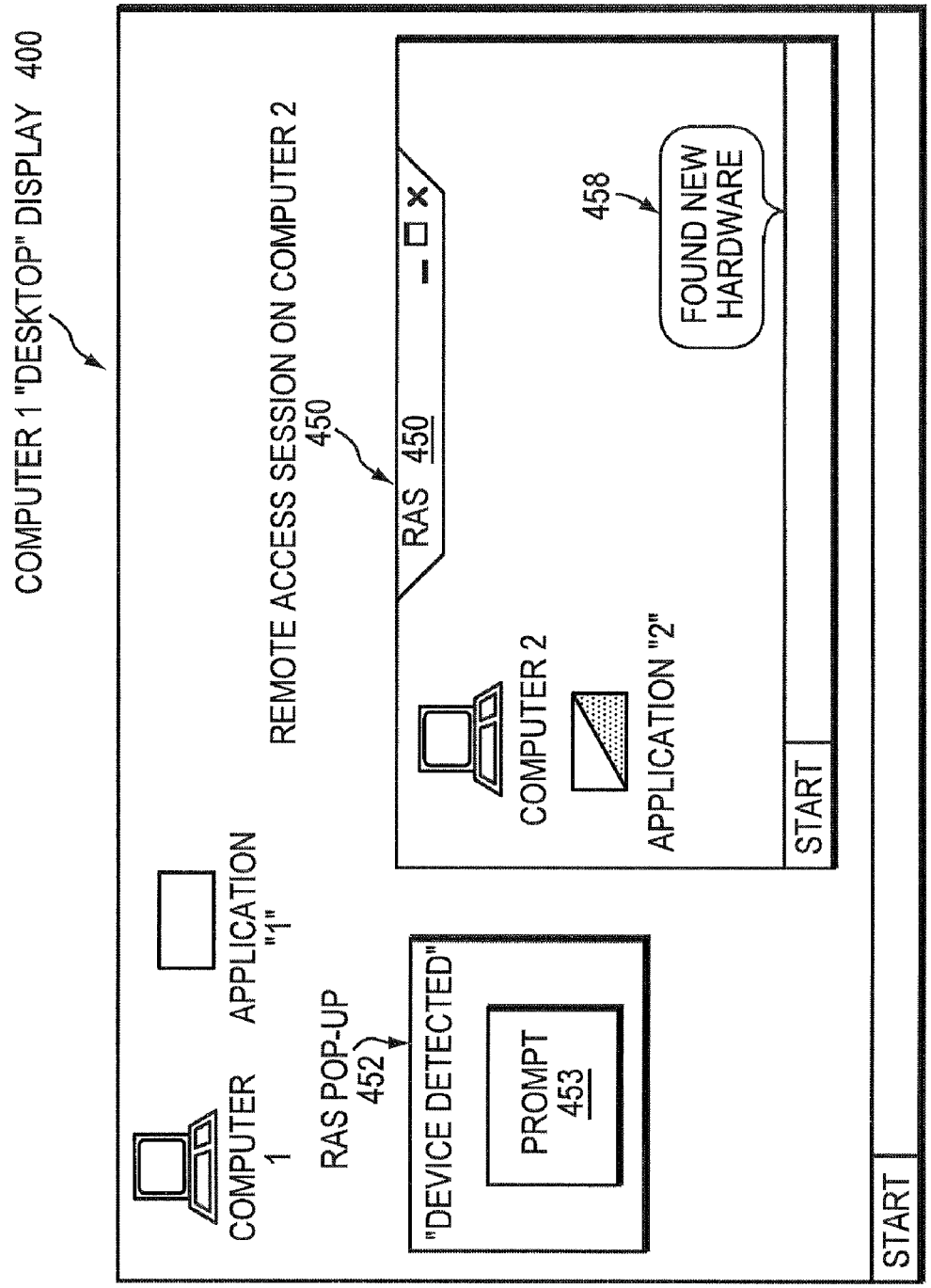
FIG. 4 illustrates an example remote access session display.

FIG. 4 illustrates an example remote access session display 400, which may be shown on a display device (e.g., a "desktop" display on a corresponding monitor) for the local computer. For instance, display 400 illustrates a "restored down" sized view of remote access session 450, which is a display generated by the remote computer. (The display 400 is shown in this manner to distinguish views and applications of the local computer and the remote computer. Those skilled in the art will appreciate that a remote access session may be viewed in a full-screen manner.) As noted above, upon detecting the device, a "pop-up" message 452 may be generated by RAS 244 and displayed on the local computer's display (or over the remote computer's display 450, such as, e.g., where a full-screen remote access session is used) indicating the detected device, and prompting the user to accept sharing the device (e.g., "prompt" 453). For example, prompt 453 may simply be a push-button acceptance, or may be a selection between sharing the device on the remote access session with the remote computer, or simply having the device locally only (or both, where such an option does not cause potential conflicts).

Figure 5:
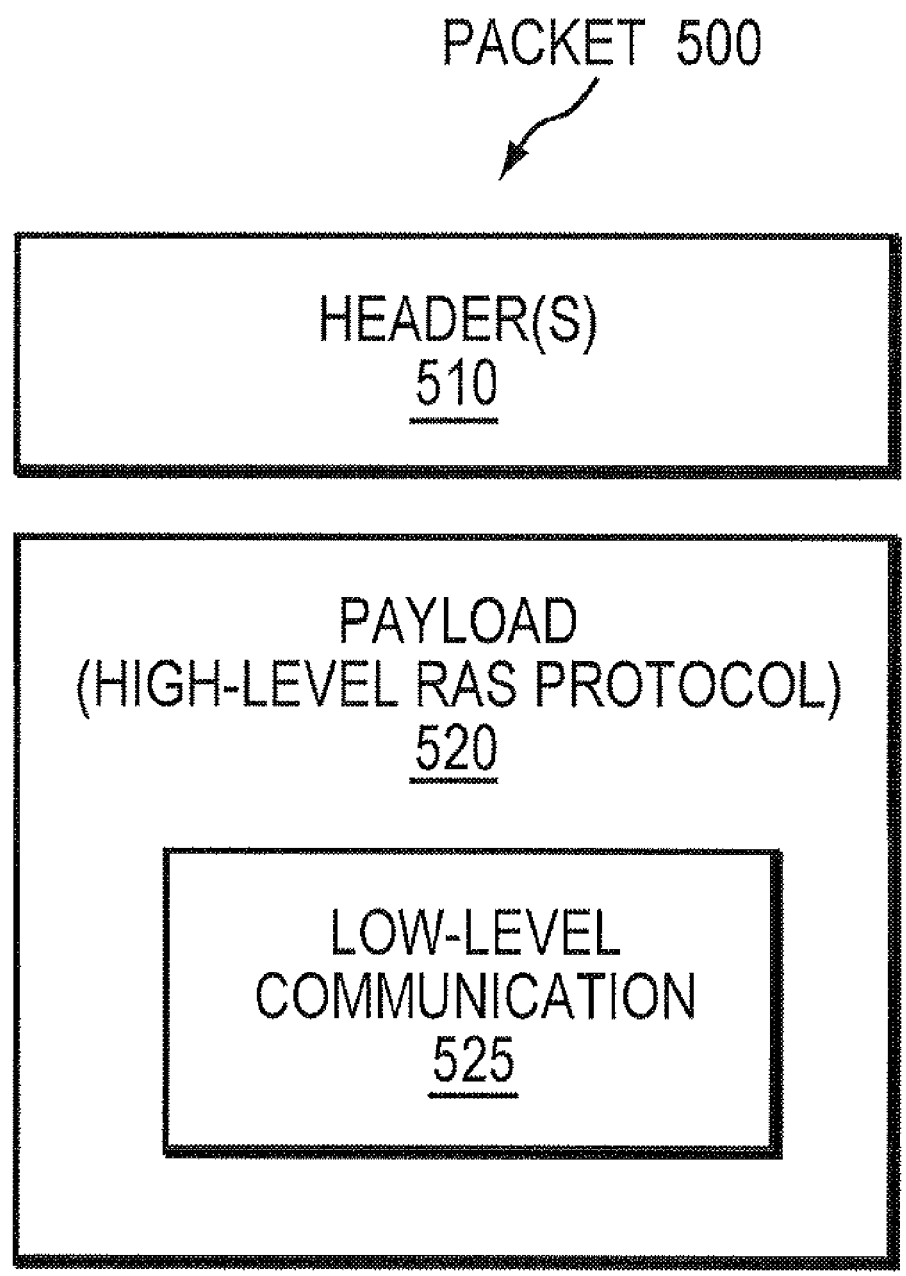
FIG. 5 illustrates an example remote access session packet.

Assuming the user allows the sharing, or alternatively, assuming no permissions need be granted by a user, the RAS 244 (referring again to FIG. 3) may intercept the low-level local communication at the first local communication port 215, and through the NI 210, may transmit the low-level local communication to the second computer via the remote access session. FIG. 5 illustrates an example packet format 500, such as in accordance with a remote access session data transmission. Packet 500 may comprise one or more headers 310 suitable for the transmission medium of the network 110 between the local and remote computers (e.g., TCP/IP headers, ATM headers, etc.), and a payload 520, illustratively according to a high-level remote access service protocol. For instance, the remote access service protocol may operate according to a proprietary protocol or language that is understood between instances of remote access service programs 244 executing on corresponding local/remote computers. According to the techniques described herein, the intercepted low-level communication may be encapsulated within the payload 520 (as field 525) to carry the non-translated low-level communication across the network 110.

Upon receiving the packet 500 at NI 218, the remote access service (RAS) 244 of the remote computer may decapsulate (remove) the low-level communications 525 from the payload 520, and "inject" the low-level local communication to the local communication port 215 of the second computer (e.g., place the low-level local communication, as received, to an input of the local communication port). In this manner, the second computer (e.g., the OS 242 of the second computer) detects low-level communication at its port 215, and responds to the low-level local communication as though the device 120 were physically located at the port 215 of the second computer. In other words, the low-level communication from the device 120 at the local computer is transmitted to the port 215 of the remote computer, such that the remote computer detects a new device (e.g., USB, Bluetooth®, etc.) at its port, even though the device is not physically located at that port. Referring briefly to FIG. 4, the remote access session display 450 may correspondingly show an information notice 458 indicating that a new device has been connected to the remote computer (e.g., a "found new hardware" notice).

According to the embodiments herein, the second computer (RAS 244 of the second computer) may correspondingly share the device communication "in reverse" to the first computer in order to communicate with the device. In other words, the OS 242 of the second computer may be configured to perform operations relating to the device, and may generate high-level communications therefore. These high level communications may be translated to low-level communications for the port 215, and intercepted by RAS 244 for transmission back to the first computer's port 215 (e.g., injected), such that the device 120 may receive the low-level communications as transmitted from the local port 215 as though the low-level local communication were sent from the first computer. In this manner, the device 120, physically connected to the local port 215, may interface (communicate with) the remote computer as though connected to the remote port 215 in both directions using the low-level communication between the device 120 and the port 215, and not a high-level translated communication.

By intercepting, transmitting, and injecting the low-level communication of the device 120 directly at the ports 215, the embodiments described herein allow for any device to be supported through remote access services, pending configuration on at least the computer not having the physically interconnected device (i.e., the computer configured to translate the low-level communication to high-level communication). For instance, the local communication ports 215 may be configured to operate as a USB port (USB and "USB2" or "USB 2.0"), a wireless personal area network port (e.g., Bluetooth®), or other types of ports operating in accordance with a low-level communication protocol. For example, device 120 may be a storage device (e.g., USB flash drives, USB hard drives), music players (e.g., an iPod® available from Apple, Inc. of Cupertino, Calif.), a personal digital assistant (PDA) or phone with a USB or Bluetooth® connection, etc.

Notably, in accordance with one or more aspects of embodiments described herein, certain devices 120 may be configured to automatically connect ("autoconnect") with the computer with which communication is established. Accordingly, then, the device 120 may be configured to autoconnect with the remote computer via the remote access session upon being connected to the port 215 of the local computer. For example, various devices, such as music players, PDAs, phones, etc., may be configured to autoconnect to a computer, such as to make function calls to initiate corresponding applications 241 (e.g., music programs, calendars, address books, etc.). Also, devices may be configured to automatically synchronize ("autosync") with a particular file folder or other storage container upon connection, such as folders storing music (to "sync" the music stored in the music player to the music folder), files storing contacts or calendars, etc.

The techniques described herein may therefore be used to allow a device 120 to autoconnect or autosync with a remote computer through a remote access session. That is, data may be sent to the device from the remote computer ("downloaded" to the device), or may be sent from the device to the remote computer ("uploaded" from the device), whether manually instructed to do so, or dynamically in response to autoconnect or autosync configuration of the device and/or computers.

Illustratively, according to one or more embodiments described herein, in the event the remote access session is not yet established, and the local computer (e.g., OS 242) determines that a newly connected device is configured to autoconnect with a remote computer, then in response, the remote access session may be established to the remote computer via RAS 244. Optionally, a user dialog (or pop-up), such as prompt 453, may be presented to a user at the local computer to confirm the remote access and/or to request any passwords or other information necessary to establish the remote access session (e.g., user name, password, remote device address, etc.). Once the remote access session is initiated, the RAS 244 of each computer may correspondingly transmit the low-level communication of the device 120 to/from ports 215, allowing for autoconnection and/or autosyncing with corresponding storage containers on the remote device. (For example, a music player plugged into the local computer may bring up a remote access session with a remote computer, which opens and executes a music program to synchronize the music player with a music folder on the remote computer. Note that without autoconnect operational, the user may manually establish the remote access session and perform the synchronization in the same manner.)

While the embodiments described above generally show the local computer (computer 1) being physically interconnected with the device 120, one or more alternative embodiments may place the device 120 in physical connection with the remote computer (e.g., computer 2). In this instance, the "local" computer is local to a user, but does not have the device 120, and the "remote" computer is remote to the user, but does have the device. That is, the terms "local" and "remote" refer to proximity to the user, and not necessarily the device. For example, assume that a device 120 may be connected to a port 215 of the remote device. If a remote access session is established between the local computer and the remote computer, the local computer may now request to receive low-level communication from the device 120. For instance, the user may be aware of the device and may specifically request that RAS 244 intercept the communication of a particular port 215, or the RAS 244 may interface with the high-level OS 242 to determine that a particular device is connected to a port 215, and, for example where beneficial to do so (such as described above), the RAS 244 of the local computer may request the low-level communication directly, as opposed to the translated high-level communication from the OS 242 of the remote computer. (As an example, a user may leave its device 120, e.g., music player, plugged into the remote port 215, such that wherever the user is located, a local computer may access the device "directly" through a remote access session, e.g., to listen to the music.)

As mentioned above, the techniques described herein are directed to low-level communications being intercepted, transmitted, and injected at a port level. The low-level communications may be encapsulated within a high-level protocol, but are otherwise not translated or interpreted to a high-level, e.g., by an operating system. These techniques are therefore distinct from high-level "device redirection" or "port redirection" (or "mapping"), as well as remote device mounting, each where high-level communications are exchanged, i.e., post device drivers, whereas the techniques described herein are pre-device-driver oriented. In this manner, the techniques described herein allow for sharing of devices even where the operating system of the computer connected to the device is unable to translate the low-level communication. Also, if the remote operating system (away from the device) is specifically configured to operate based on the low-level communication (e.g., automatically connecting or syncing the device), the remote computer's operating system may now be privy to the low-level communication, and may operate accordingly. For instance, USB or Bluetooth® devices with proprietary protocols (e.g., music players) may be used during remote access sessions, particularly being able to automatically synchronize with a corresponding database on the remote computer when connected to the local computer (that is, the techniques herein also allow for dynamically autoconnecting and autosyncing).

Figure 6:
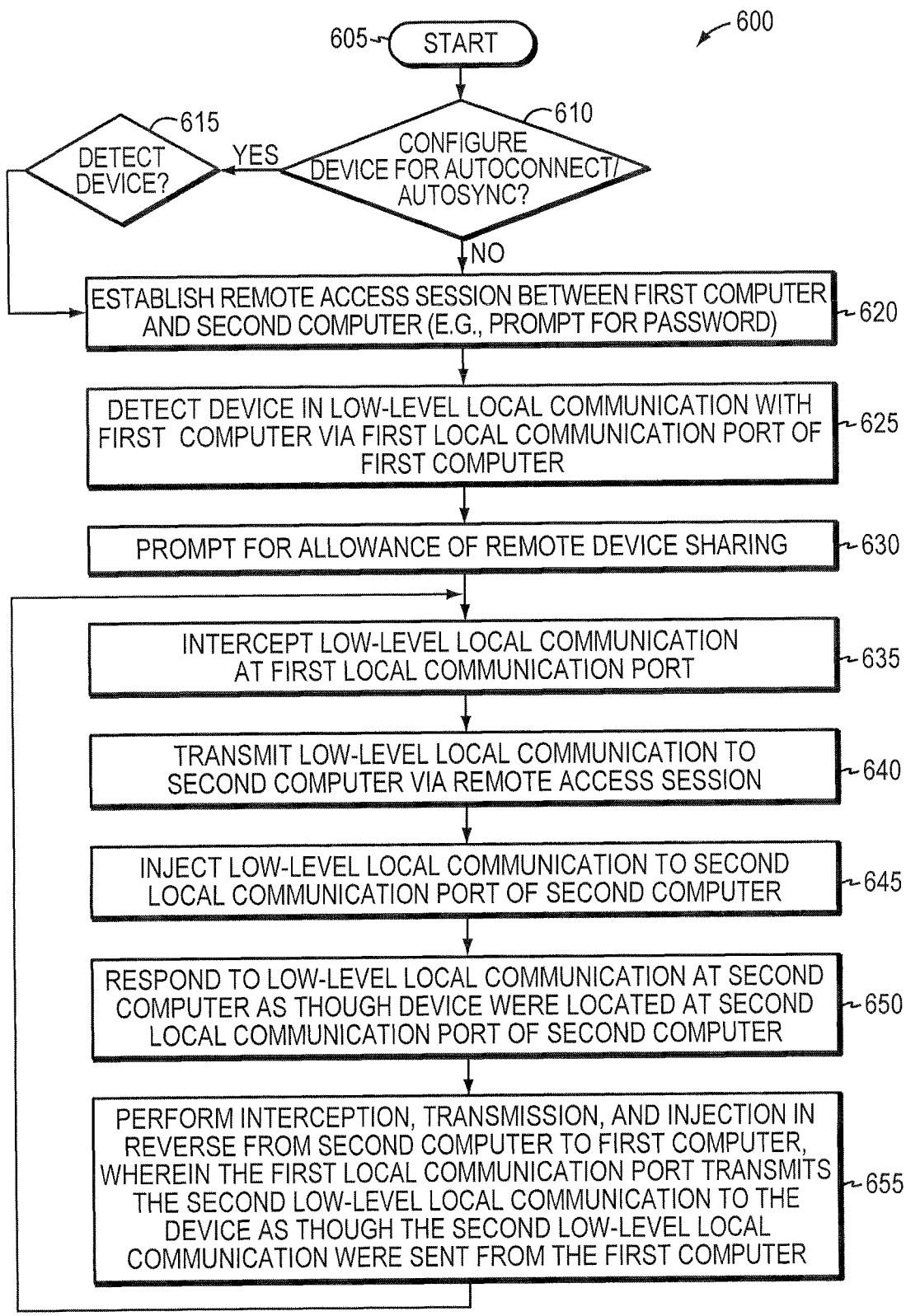
FIG. 6 illustrates an example procedure for remotely sharing local devices via remote access sessions.

FIG. 6 illustrates an example procedure for remotely sharing local devices via a remote access session in accordance with one or more embodiments described herein. The procedure 600 starts at step 605, and continues to step 610, where a device 120 may either be configured for autoconnect and/or autosync operations, as described above, or not. In the event the device is so configured, in step 615, the detection of such a device may correspondingly (e.g., post prompting for a password) initiate establishment of a remote access session between a first computer and a second computer in step 620. Alternatively, if the device is not so configured (or if the session if so desired to do so in advance), the remote access session may be established in step 620 without being in response to detecting the device.

In step 625, the device may be detected (e.g., by the remote access services client 244) in low-level local communication with first computer via first local communication port 215 of the first computer (e.g., a USB device plugged into a USB port). Optionally, in step 630, the remote access session may prompt a local user to allow the remote device sharing, as mentioned above. In step 635, the remote access service intercepts the low-level local communication at the first local communication port 215, and in step 640 transmits the low-level local communication to the second computer via the remote access session (e.g., encapsulated in session packets 500).

Upon receiving the low-level communication, the remote access service at the second computer in step 645 may inject the low-level local communication to the second local communication port of the second computer, such that in step 650, the second computer may respond to the low-level local communication as though the device 120 were located at the second local communication port of the second computer, as described in detail above. For instance, in step 655, the remote computer may perform the interception, transmission, and injection in reverse toward the first computer. In other words, the second computer acts as though the device 120 were connected to the second computer, when in fact, the device is connected to the first computer. Accordingly, then, in step 655, the low-level communications sent to the second computer's port are intercepted and transmitted to the first computer for injection to the first computer's port, and the first local communication port transmits the second low-level local communication to the device as though the second low-level local communication were sent from the first computer.

The procedure 600 may continue to execute between steps 635 and 655, allowing for remote sharing of a locally attached device between the first and second computers accordingly. Note that while procedure 600 illustratively demonstrates an embodiment where the first computer is the local computer (local to a user and having the device) and the second computer is the remote computer (remote to the user and not having the device), other embodiments as described above may also be possible. For instance, the second computer may be the local computer (local to the user and not having the device) while the first computer may be the remote computer (remote to the user and having the device). In this manner, a device connected to a remote computer may also be accessed via the remote access session at the local computer, as mentioned above, with only slight modification to the procedure 600 as described.

Advantageously, the novel techniques described herein remotely share local devices via a remote access session in a computer network. By intercepting low-level communications at the port (e.g., USB, Bluetooth®, etc.,), the novel techniques allow for any device to be shared between computers of a remote access session, without the need for interpretation of the low-level communication protocol. In particular, the techniques described above allow for current functionalities, such as autoconnect and/or autosync operations, to be performed as though the remote device were locally connected. Also, the dynamic aspects of one or more embodiments described herein alleviate the need for cumbersome and inefficient manual configuration (e.g., manually mounting the local device at the remote computer).

While there have been shown and described illustrative embodiments that remotely share local devices via a remote access session in a computer network, it is to be understood that various other adaptations and modifications may be made within the spirit and scope of the present invention. For example, the embodiments have been shown and described herein for use with remote access sessions or web browser-based applications, such as online collaborative computing sessions. However, the embodiments of the invention in their broader sense are not so limited, and may, in fact, be used with other applications/sessions, as may be appreciated by those skilled in the art. Also, while certain local communication port protocols are discussed (e.g., USB, USB2.0, wireless personal area networks, Bluetooth®), other local communication ports and associated protocols may be used in accordance with the embodiments herein.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   detecting a device is connected to a first computer and is in low-level local communication with the first computer via a first local communication port of the first computer;
   determining that the device is configured to autoconnect with a second computer upon connection of the device to the first computer;
   establishing a remote access session between the first computer and the second computer in response to the detecting the device is connected to the first computer and the determining that the device is configured to autoconnect with the second computer upon connection of the device to the first computer, wherein the remote access session is an online collaborative computing session;
   intercepting the low-level local communication at the first local communication port;
   transmitting the low-level local communication to the second computer via the remote access session; and
   injecting the low-level local communication to a second local communication port of the second computer, wherein the second computer responds to the low-level local communication as though the device were located at the second local communication port of the second computer.

2. The method as in claim 1, further comprising:
   configuring the device to autoconnect with the second computer via the remote access session upon connection of the device to the first computer.

3. The method as in claim 1, further comprising:
   prompting for a password to establish the remote access session in response to detecting the device is connected to the first computer and determining that the device is configured to autoconnect with the second computer upon connection of the device to the first computer.

4. The method as in claim 1, further comprising:
   performing an autosync operation between the device and a corresponding file folder of the second computer.

5. The method as in claim 1, further comprising:
   sending a second low-level local communication from the second computer to the second local connection port;
   intercepting the second low-level local communication at the second local communication port;
   transmitting the second low-level local communication to the first computer via the remote access session; and
   injecting the second low-level local communication to the first local communication port of the first computer, wherein the first local communication port transmits the second low-level local communication to the device as though the second low-level local communication were sent from the first computer.

6. The method as in claim 1, wherein the first computer is a local computer and the second computer is a remote computer.

7. The method as in claim 1, wherein the second computer is a local computer and the first computer is a remote computer.

8. The method as in claim 1, wherein the first and second local communication ports are selected from a group consisting of: a universal serial bus (USB) port, and a wireless personal area network port.

9. The method as in claim 1, wherein the device is selected from a group consisting of: a storage device, a music player, a personal digital assistant (PDA), and a phone.

10. The method as in claim 1, wherein the low-level local communication comprises messages having a format and content defined by a protocol suitable for communication between the local communication port and the device.

11. A first computer, comprising:
    a first local communication port;
    a network interface;
    a processor; and
    a memory configured to store one or more software processes executable by the processor, the one or more software processes including
      a local communication port driver configured to
        provide low-level local communication between the first computer and a device connected to the first computer via the first local communication port, and
      a remote access service configured to
        detect the device is connected to the first computer and is in low-level local communication with the first computer,
        determine that the device is configured to autoconnect with a second computer upon connection of the device to the first computer,
        establish a remote access session between the first computer and the second computer via the network interface in response to the device being connected to the first computer and configured to autoconnect with the second computer upon connection of the device to the first computer, wherein the remote access session is an online collaborative computing session, intercept the low-level local communication at the first local communication port, and transmit the low-level local communication to the second computer via the remote access session, to enable the second computer to respond to the low-level local communication as though the device were located at a second local communication port of the second computer.

12. The first computer as in claim 11, wherein the first communication port is selected from a group consisting of: a universal serial bus (USB) port, and a wireless personal area network port.

13. The first computer as in claim 11, wherein the device is selected from a group consisting of: a storage device, a music player, a personal digital assistant (PDA), and a phone.

14. A method, comprising:

establishing an online collaborative computing session between a first computer and a second computer;

detecting a device is connected to the first computer and is in low-level local communication with the first computer via a first local communication port of the first computer;

intercepting the low-level local communication at the first local communication port;

transmitting the low-level local communication to the second computer via the online collaborative computing session; and injecting the low-level local communication to a second local communication port of the second computer, wherein the second computer responds to the low-level local communication as though the device were located at the second local communication port of the second computer.

15. The method as in claim 14, further comprising:

configuring the device to autoconnect with the second computer via the online collaborative computing session upon connection of the device to the first computer.

16. The method of claim 14, further comprising:

performing an autosync operation between the device and a corresponding file folder of the second computer.

17. The method of claim 14, further comprising:

sending a second low-level local communication from the second computer to the second local connection port;

intercepting the second low-level local communication at the second local communication port;

transmitting the second low-level local communication to the first computer via the online collaborative computing session; and injecting the second low-level local communication to the first local communication port of the first computer, wherein the first local communication port transmits the second low-level local communication to the device as though the second low-level local communication were sent from the first computer.

18. The method of claim 14, wherein the first communication port is selected from a group consisting of: a universal serial bus (USB) port, and a wireless personal area network port.

19. The method of claim 14, wherein the device is selected from a group consisting of: a storage device, a music player, a personal digital assistant (PDA), and a phone.

20. A first computer, comprising:

a first local communication port;

a network interface;

a processor; and a memory configured to store one or more software processes executable by the processor, the one or more software processes including a local communication port driver configured to provide low-level local communication between the first computer and a device connected to the first computer via the first local communication port, and a remote access service configured to establish an online collaborative computing session between the first computer and a second computer, detect a device is connected to the first computer and is in low-level local communication with the first computer via a first local communication port of the first computer, intercept the low-level local communication at the first local communication port, and transmit the low-level local communication to the second computer via the online collaborative computing session, to enable the second computer to inject the low-level local communication to a second local communication port of the second computer and respond to the low-level local communication as though the device were located at a second local communication port of the second computer.

21. The first computer as in claim 20, wherein the local communication port driver is further configured to detect the device is configured to autoconnect with the second computer via the online collaborative computing session upon connection of the device to the first computer.

22. The first computer as in claim 20, wherein the remote access service is further configured to perform an autosync operation between the device and a corresponding file folder of the second computer.

23. The first computer as in claim 20, wherein the first communication port is selected from a group consisting of: a universal serial bus (USB) port, and a wireless personal area network port.

24. The first computer as in claim 20, wherein the device is selected from a group consisting of: a storage device, a music player, a personal digital assistant (PDA), and a phone.

* * * * *